United States Patent [19]

Miller et al.

[11] Patent Number: 4,549,449

[45] Date of Patent: Oct. 29, 1985

[54] GEAR REDUCER

[75] Inventors: Richard W. Miller; Jay Nagao; Steve Dexter, all of Lafayette, Ind.

[73] Assignee: Fairfield Manufacturing Company, Lafayette, Ind.

[21] Appl. No.: 540,460

[22] Filed: Oct. 11, 1983

[51] Int. Cl.$^4$ .............................................. F16H 3/78
[52] U.S. Cl. ........................................ 74/785; 74/364
[58] Field of Search ................ 74/785, 786, 787, 364, 74/750 R; 192/85 C, 85 CA, 109 A, 98

[56] References Cited

U.S. PATENT DOCUMENTS

| | | | |
|---|---|---|---|
| 1,225,144 | 5/1917 | Land | 192/109 A |
| 2,066,952 | 1/1937 | Tornebohm | 74/750 R |
| 3,115,791 | 12/1963 | Dean | 74/785 X |
| 3,831,695 | 8/1974 | Osterloff et al. | 74/750 R |
| 3,960,035 | 6/1976 | Workman, Jr. et al. | 74/785 |
| 4,286,480 | 9/1971 | Dickie | 74/785 |
| 4,440,042 | 4/1984 | Holdeman | 74/785 |
| 4,462,274 | 7/1984 | Reppert et al. | 74/750 R X |

FOREIGN PATENT DOCUMENTS 872821  6/1942  France .................................. 74/364

Primary Examiner—Leslie A. Braun
Assistant Examiner—Dwight G. Diehl
Attorney, Agent, or Firm—William L. Falk

[57] ABSTRACT

A plural speed planetary gear box has an input member and output member coupled together directly by a shiftable coupling sleeve or coupled together indirectly by a planetary gear set. The shift from direct to indirect coupling involves shifting the coupling sleeve out of direct coupling position between the input and output members to a different position in which the input member is coupled to one portion of the planetary gear set and the output member is coupled to another portion of the planetary gear set. A hydraulically actuated piston drives the coupling sleeve through a resiliently loaded lost motion isolator which applies a first force to the coupling sleeve for disengagement, and also applies a second force to the coupling sleeve to produce meshing engagement with the input member or with the planetary gear set element.

5 Claims, 4 Drawing Figures

GEAR REDUCER

BACKGROUND OF THE INVENTION

This invention relates to mechanical gear boxes and more particularly to a two speed gear box with a hydraulic piston actuated shifter and an isolator to isolate the gears from the force of the hydraulic shifting piston.

Many mechanical drive arrangements require a gear box in the drive train to change the speed and the torque of the driver to a speed and torque suitable for the load. Often the input to the gear box is from a high speed electric or hydraulic motor and the output is a low speed high torque drive to the input shaft of the load. A particularly apt gearing arrangement to achieve a high ratio gear change is the planetary gear box.

In many applications it would be very desirable to have the capability of shifting between two gear ratios in the gear box. One application for such a device would be in the drive train of large construction or mining equipment. These large vehicles are often driven independently at each wheel by hydraulic motors acting through reduction gear boxes. In its periods of normal operation such as ascending a steep grade with a heavy load or working the earth, the gear box would be in its high reduction configuration, for example, 3.47:1, and the speed of the vehicle would be determined by the output of a variable capacity hydraulic pump connected to the vehicle prime mover. Then, when the vehicle is to be moved on level terrain without load or when it is being transferred between work stations, a much higher operating speed would be desired to effect the rapid transfer. To accomplish this, the gear box would be shifted from its high reduction mode to its directly coupled 1:1 drive mode so that the speed range within the operating range of the hydraulic pump is much higher.

There have been a few attempts to produce a mechanically reliable two speed planetary gear box without clutches which permits a shift between a 1:1 drive ratio and a high reduction drive ratio. However, these devices all suffer from the same basic defect, namely, the hydraulic pressure needed to reliably shift the speed reducer produces a sudden and occasionally nonmeshing engagement between the gears when they shift which can damage or destroy the gears. Also, the speed limitations of hydraulic shifters make partial engagement of the shifter possible, which can lead to damage to the gears and the shifter. In addition, it may be desirable to provide a shifting force which is high enough to disengage the gear box even under load, but should provide only a gentle engaging pressure so that the gears will not be forced into engagement under load and be damaged in the process.

SUMMARY OF THE INVENTION

Accordingly, it is an object of this invention to provide a two speed gear box of simple rugged and inexpensive construction with built-in protection against damage from misuse. Another object of the invention is to provide a two speed gear box having a hydraulic shifter which can apply full hydraulic force to shift the gear box out of engagement, or into neutral, but will not force the gears into damaging engagement. Yet another object of the invention is to provide a two speed planetary gear box having a hydraulic shifting mechanism with a shifting force isolator that permits instantaneous disengagement of the gears but prevents engagement of the gears under conditions that would damage the gears. A further object of the invention is to provide a gear box that applies full hydraulic power to effect gear disengagement and stores hydraulic power in a resilient spring that can act fast to snap the gears into full engagement as soon as alignment occurs.

These and other objects of the invention are attained in a planetary gear box having input and output members which may be coupled directly by a shiftable coupling sleeve or coupled together indirectly through a planetary gear set. The shift from direct to indirect coupling is accomplished by shifting the coupling sleeve out of direct coupling position between the input and output members to a second position in which the input member is coupled to one of the elements of the planetary gear set, and the output member is coupled to another of the elements of the planetary gear set. Shifting of the coupling sleeve is accomplished by a hydraulic piston within the gear case which drives the coupling sleeve through a resiliently loaded lost motion isolator that applies the full hydraulic force to the coupling sleeve to move the coupling sleeve to disengage position, but which applies only the gentle force of the resilient member to the coupling sleeve to produce meshing engagement with the output member or with the planetary gear set element.

DESCRIPTION OF THE DRAWINGS

The invention and its many attendant objects and advantages will become better understood upon reading the following detailed description of the preferred embodiment in conjunction with the following drawings, wherein.

DESCRIPTION OF THE PREFERRED EMBODIMENT

Figure 1:
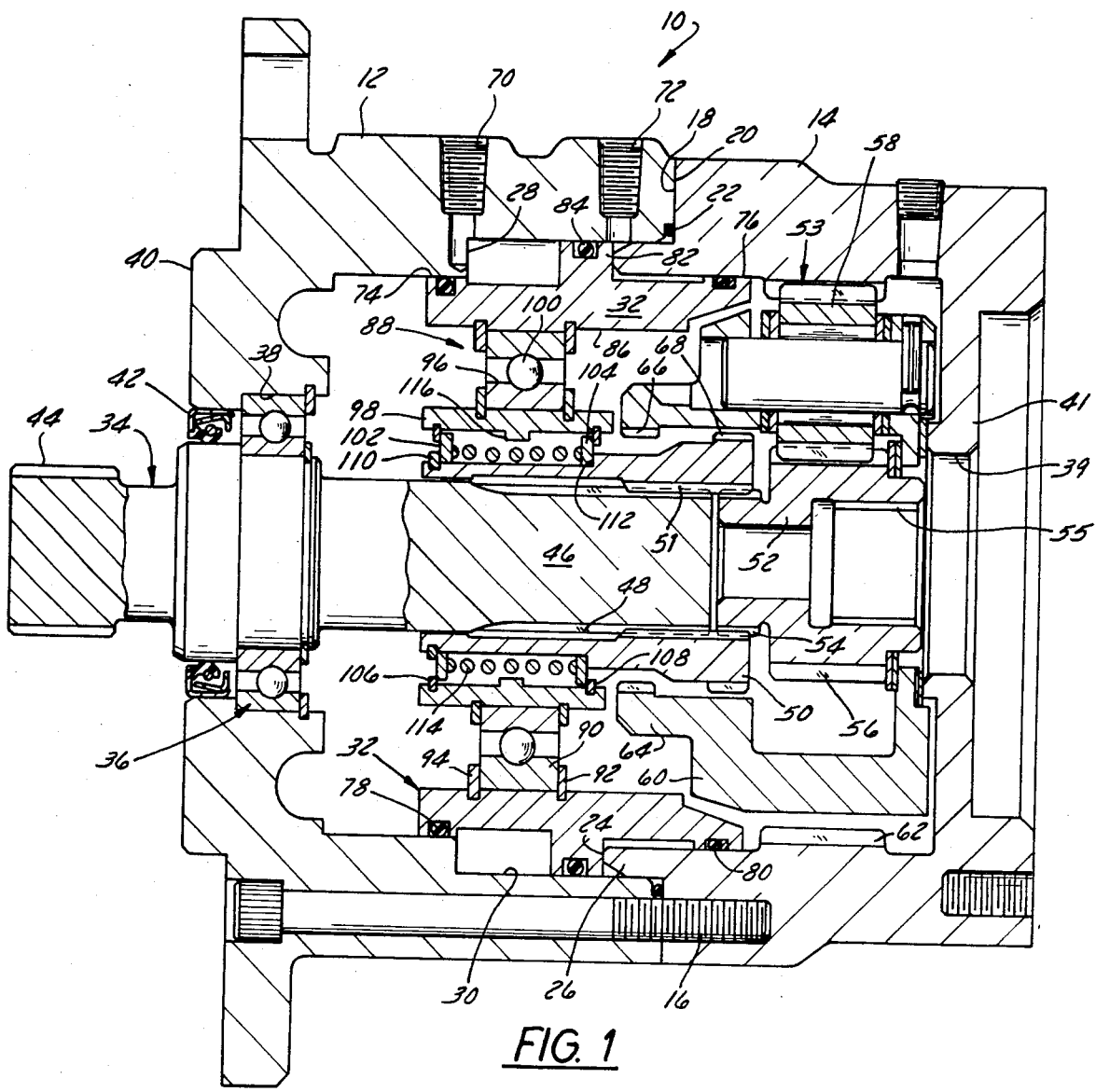
FIG. 1 is a cross-sectional elevation of a planetary gear box constructed in accordance with this invention.

Referring now to the drawings wherein like reference characters designate identical or corresponding parts, and more particularly to FIG. 1 thereof, a planetary two speed gear box is shown having a cylindrical casing 10 formed of two nested axial sections, a flange section 12 and a ring section 14 nested together coaxially and fastened together by bolts 16. The ring section 14 of the casing 10 has an external rabbet 18 formed in the inwardly facing axial end thereof which receives the inner end 20 of the flange section 12. An O-ring 22 is squeezed between the inner end 20 of the flange section 12 and the rabbet 18 to provide a fluid tight seal between the two axial halves of the casing 10.

An internal cylinder 30 is formed by two axially facing surfaces 24 and 28, and by the internal surface of the flange section 12 between those surfaces. The surface 24 is the axially facing end surface on the inner axial end of an axially projecting lip 26 on the ring section 14 formed by the rabbet 18. The surface 28 is the radially extending, axially facing shoulder 28 formed by an internal step in the flange section 12. The two surfaces 24 and 28 form the axial ends of the working cylinder 30 in which a shift actuator in the form of a tubular piston 32 moves axially under pneumatic or hydraulic pressure to shift the gear box between its two gear ratios. Hydraulic actuation will normally be selected when the driver is a hydraulic motor.

An output shaft 34 is journaled in bearings 36 mounted in an axial bore 38 in the axial outer end 40 of the flange section 12. The bore 38 is coaxially aligned with a bore 39 in the outer end face 41 of the ring section 14. A seal 42 is mounted in the bore 38 outside of the bearing 36 to protect the bearing 36 from contamination with dirt and to prevent ingress of dirt into the interior of the casing 10. An integral gear or spline 44 is provided on the axially outer end of the output shaft 34 and the axial inner portion 46 of the output shaft 34 is splined at 48 and is engaged with a splined shifting collar 50. The shifting collar 50 remains always coupled in torque transmitting relationship to the output shaft 34 but is capable of moving axially along the output shaft into and out of splined engagement with an input member in the form of a sun gear 52 of a plantary gear set 53.

Figures 3, 4:
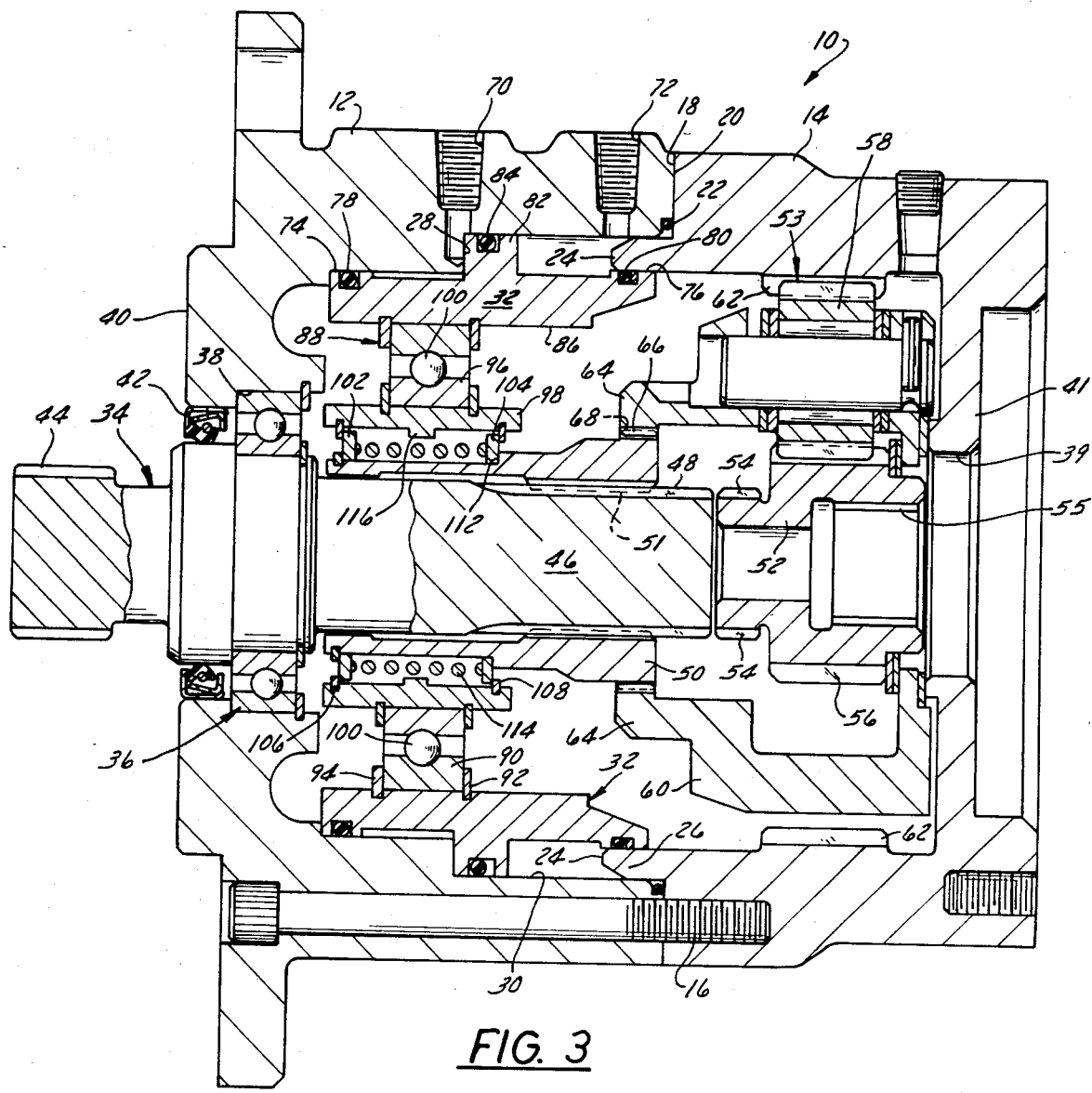
FIG. 3 is a cross sectional elevation of the gear box shown in FIG. 1 with the shift to the other gear completed.
FIG. 4 is a schematic view of the gear box shown in FIG. 1 with the piston travel completed for shifting to the gear position shown in FIG. 1 and with the shifter awaiting alignment to complete shifting.

The inner axial end of the sun gear 52 is externally splined at 54 to mesh with the internal spline of the shifting collar 50 when it is in its rightmost position as shown in FIG. 1. The central portion of the sun gear 52 has integrally formed external gear teeth 56 which are in constant mesh with a series of planet gears 58 journaled in a planet carrier 60 of the planetary gear set 53. The planet gears 58 are also in constant mesh with a ring gear 62 which is integrally formed on the inner surface of the ring section 14 of the casing 10. The axial inner end of the planet carrier 60 is formed in a cylindrical extension 64 which has radially inwardly extending teeth of a spline 66 formed on the end thereof. A corresponding spline 68 is formed on the external surface of the rightmost end of the shifting collar 50. When the shifting collar 50 is shifted to the left as illustrated in FIG. 3, the splines 66 and 68 engage to form a torque transmission coupling between the shifting collar 50 and the planet carrier 60.

The shifting mechanism for shifting the gear box between its two gear ratios is driven by an actuator such as the piston 32 which slides axially along the inner surface of the casing 10 under the influence of hydraulic pressure admitted through ports 70 or 72. A pair of outwardly facing lands 74 and 76 are formed on the axial ends of the piston 32 for guiding and sealing the ends of the piston on the inner surfaces of the flange section 12 and the ring section 14 of the casing 10. The lands 74 and 76 are each provided with an outwardly opening annular groove which contains a sealing ring 78 and 80, respectively. The central portion of the piston 32 includes a bourrelet or annular vane 82 which extends into the working cylinder 30 and is provided with an outwardly opening groove in its outer peripheral surface which contains a sealing ring 84. Under the force of hydraulic pressure selectively delivered through the ports 70 and 72 and acting on one or the other axially facing surface of the bourrelet 82, the piston 32 can be driven axially back and forth between the limits established by the shoulders 24 and 28 at the axial ends of the working cylinder 30.

The tubular piston 32 has a radially inwardly facing surface 86 radially spaced from the shifting collar or coupling sleeve 50. A bearing 88 is mounted by snap rings on the surface 86 of the tubular piston 32. The bearing 88 includes an outer race 90 held axially on the outer surface of the tubular piston 32 by snap rings 92 and 94. An inner bearing race 96 is mounted on a radially facing outer cylindrical surface of a ferrule 98 by similar snap rings, and a plurality of balls or other roller elements 100 is captured between the two bearing races and allows the inner race to turn while the outer race remains rotationally stationary, and allows the transmission of axial force from one race to the other through the balls 100.

The ferrule 98 is coaxially disposed around the coupling sleeve 50 and a pair of discs 102 and 104 positioned on the sleeve 50 for axial sliding motion there along. A pair of snap rings 106 and 108 mounted in the inner cylindrical surface of the ferrule 98 prevent movement of the discs 102 and 104 axially beyond the ends of the ferrule 98, but permit relative translation of the discs 102 and 104 relative to the ferrule axially inwardly toward the axial center of the ferrule. A snap ring 110 at the leftmost axial end of the sleeve 50 and a shoulder 112 on the sleeve likewise prevent translation of the discs 102 and 104 relative to the coupling sleeve 50 axially outward beyond the end of the sleeve 50 and shoulder 112 but permit movement of the discs 102 and 104 axially inward into the space defined between the snap ring 110 and the shoulder 112. A coil spring 114 is disposed in the cylindrical space defined between the axially facing surfaces of the discs 102 and 104 and between the radially facing surfaces of the ferrule 98 and the coupling sleeve 50. An annular rib 116 located at the axial center line of the ferrule 98 projects inwardly from the inner cylindrical surface of the ferrule 98. The rib 116 acts as a stop to prevent translation of the discs 102 or 104 axially relative to the ferrule 98 beyond its center, and functionally, to form a lost motion, positive mechanical connection between the piston 32 and the sleeve 50, as explained below.

The operation of the shift mechanism will now be explained with reference to FIGS. 1-4. In FIG. 1 the gear box is shown engaged in a 1:1 direct drive coupling configuration with the coupling sleeve 50 directly coupling the output shaft 34 to the input member 52. FIG. 3 shows the gear box in a gear reduction mode in which the coupling sleeve 50 couples the output shaft 34 through the planetary gear set 53 to the input member 52. The shift from the configuration of FIG. 1 to the configuration of FIG. 3, a hydraulic control valve (not shown) is moved to connect the fluid port 70 to a hydraulic sump, and the fluid port 72 to a source of hydraulic pressure. The working cylinder on the right side of the piston bourrelet 82 is pressurized and the pressure acts against the rightward facing surface of the bourrelet to drive piston 32 to the left to the position shown in FIG. 2.

Figure 2:
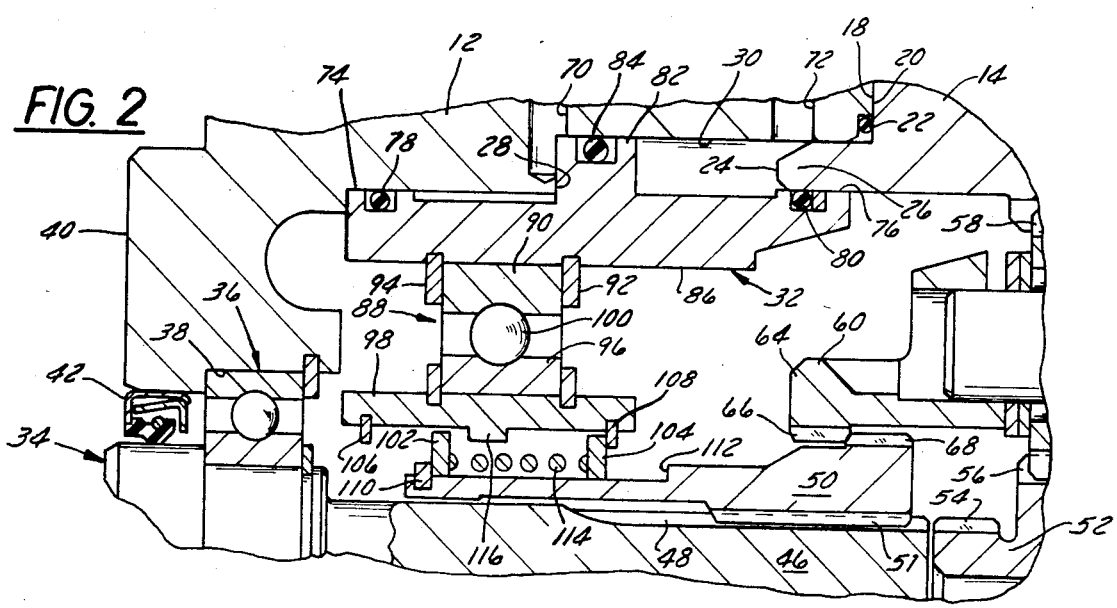
FIG. 2 is a schematic view of the gear box shown in FIG. 1 with the piston travel completed and the gear shifter awaiting alignment to complete shift.

As shown in FIG. 2, the piston has moved completely through the working cylinder 30 to its leftmost position and has moved the ferrule 98 through its full range of motion to the left also. However, the coupling sleeve 50 has moved only halfway because it was not positively driven until the rib 116 engaged the disc 102 and, through the snap ring 110, exerted axial force on the sleeve 50. The lost motion permitted by the movement of the disc 104 along the coupling sleeve away from the shoulder 112 caused the spring 114 to be compressed in the shorter space between the discs 102 and 104. By coupling the ferrule 98 with the sleeve 50 through the spring 114 for half of its travel, the full force exerted by the piston, which can be well in excess of 2500 pounds, is brought to bear on the coupling sleeve 50 for half of its travel by the engagement of the annular rib 116 with the disc 102 which is prevented from leftward translation relative to the shift coupling 50 by the snap ring 110. The leftward movement of the piston under the influence of hydraulic pressure forceably drives the coupling sleeve 50 to the left, disengaging the spline 51 of the coupling sleeve 50 from the spline 54 of the output sun gear 52.

As shown in FIG. 2, the piston has moved fully to its leftmost position and has forceably disengaged the coupling sleeve 50 from the input sun gear 52. The strong force exerted by the piston is now isolated from the coupling sleeve 50 because the piston has reached the end of its travel against the shoulder 28. The only force acting on the coupling sleeve 50 is the force of the isolator spring 114 which is designed to gently urge the coupling sleeve to the left so that the external spline 68 on the sleeve 50 engages without damage with the internal spline 66 on the planet carrier 60. This force, in the neighborhood of 60 pounds, is sufficient to cause reliable engagement of the two spline members without causing damage to the splines which would occur if they were forced into engagement under the full force exerted by the piston 32. In addition, the spring 114 acts instantaneously, much faster than the hydraulic action, and it drives only the sleeve 50 so there is little inertial to overcome. Accordingly, as soon as the teeth of the sleeve 50 and spline 66 are aligned, the sleeve will snap fully into an engaged position in the spline 66.

The reverse motion is similar. To shift from the position shown in FIG. 3 to the position shown in FIG. 1, the control valve is moved to connect the fluid port 70 to a source of fluid pressure and the fluid port 72 is connected to the fluid sump. This pressurizes the leftmost face of the piston bourrelet 82 which causes the piston to commence motion toward the right. As the piston moves, the ferrule 98 moves with it and the snap ring 106, engaging the disc 102, moves the disc to the right compressing the spring 114 as it moves. When the piston has reached its halfway point in its motion to the right, the rib 116 on the ferrule 98 engages the disc 104 which, because of its engagement against the shoulder 112, drives the coupling sleeve 50 toward the right and disengages its external spline 68 from the internal spline 66 on the planet carrier 60. When the piston reaches the end of its travel against the end face 24 of the lip 26, the full force of the piston no longer acts against the coupling sleeve 50 and only the force of the isolator spring 114 acting against the leftmost face of the disc 104 is exerted against the coupling sleeve 50. This gentle force urges the coupling sleeve 50 toward to the right so that the spline 51 of the coupling sleeve springs smoothly into engagement with the external spline 54 on the input sun gear 52 the instant the teeth are aligned. In this way, it is possible to ensure that the coupling sleeve 50 will disengage without damage, from the planet carrier spline 66 and will engage, without damage, with the spline 54 of the input sun gear.

The planetary gear box shown herein is thus capable of shifting between a gear ratio of 1:1 and some other higher selected gear ratio. For example, the gear box shown herein is designed to provide a gear reduction of 3.47:1 although other reduction ratios are possible. The structure is extremely rugged and, because of the full circumferential engagement of the coupling members and the load spreading achieved by the planetary gears is capable of carrying high torque, in the neighborhood of 3500 pound inches. Although the device is extremely rugged and reliable, it is relatively inexpensive to manufacture because most of the parts are cylindrical turnings and, therefore, high volume, low cost automated machining techniques may be used in its manufacture. The incorporation of the hydraulic shifting mechanism entirely in the casing eliminates the usual awkwardly projecting cylindrical piston which many shiftable gear boxes require and the shifting forces are perfectly balanced so that there is no tendency for the shift mechanism to cock and jam inside the casing. The use of the inside diameter of the casing as the hydraulic cylinder is particularly felicitous because it utilizes structure which must be in the gear box in any case and it utilizes the large diameter of the case to provide a large surface area for the fluid pressure to act against without occupying the space that a large piston normally occupies.

Obviously, numerous modifications and variations of the disclosed preferred embodiment are possible. For example, other resilient agencies could be substituted for the spring 114, such as gas or elastomeric springs. In addition, the form of coupling between the output member 34 and the input member 52 can be varied widely as would be understood by those skilled in the art upon reading this disclosure. Naturally this gear box could be used as an overdrive as well as a reduction drive by merely driving the shaft 34 instead of the input member 52. Therefore, it is expressly to be understood that these and other modifications and variations and the equivalence thereof may be practiced while remaining within the spirit and scope of the invention as defined in the accompanying claims.

What is claimed is:

1. A plural speed gear box, comprising:
   a casing having an interior cylindrical wall;
   a tubular piston within said casing mounted for axial sliding motion on said cylindrical wall;
   a gear shifter within said casing mounted for axial motion under the influence of said piston;
   an input drive member and an output drive member journaled in said casing, wherein said gear shifter is splined to and rotates with said output member, and said piston is rotationally stationary with respect to said casing;
   a reduction gear set engaged with said input drive member;
   a second gear set disposed in said casing for coupling of said input drive member and said output drive member by said shifter at a gear ratio different from that of said reduction gear set;
   coupling means for coupling said gear shifter and said piston to enable said piston to move said gear shifter axially between one position in which said reduction gear set is coupled with said output drive member through said shifter and a second position in which said reduction gear set is decoupled from said output drive member, and said input drive member is coupled to said output drive member through said second gear set; said coupling means including a bearing for transmitting minimal torque between said gear shifter and said piston while transmitting full axial force of said piston to said gear shifter to permit axial coupling between the rotating output member and the non-rotating piston; said coupling means further including isolator means for introducing a momentary retardation of the motion of the said shifter when said piston moves so the shifting motion of said shifter can be completed smoothly when the gear teeth of said shifter are aligned with the gear teeth on said reduction gear set or said second gear set and providing the only force to move said gear shifter so that said input member is coupled to said output member through said second gear set;

said isolator means including a spring having one end operatively engaged with said shifter and the other end operatively engaged with said piston;

said isolator means further including a ferrule coaxially surrounding a portion of said shifter and two discs, one near each end of said ferrule bearing against a shoulder on said ferrule and said shifter and urged thereagainst by said spring whereby motion of said ferrule compresses said spring between said discs to increase the spring force tending to move said shifter in the direction of motion of said ferrule;

said isolator means further including a positive mechanical connection between said piston and said shifter for a portion of the motion of said piston to provide sufficient force on said shifter to disengage it from said second gear set or said reduction gear set; and said positive mechanical connection includes an inwardly projecting rib on said ferrule located centrally along the axial length thereof and projecting inwardly far enough to engage said discs when said ferrule has moved the distance between said rib and said discs, whereby said piston positively moves said ferrule which compresses said spring and exerts a spring force on said shifter, and then said rib engages one of said discs and establishes a positive mechanical connection between said piston and said shifter to disengage said shifter from one of said second gear sets and said reduction gear set, whereupon said piston reaches the end of its travel before said shifter engages with the other of said second gear set and said reduction gear set so that said engagement is made only under said spring force.

2. A plural speed gear box designed for direct connection to a driver without intermediate clutches, comprising:

a gear casing;

an output member and input member within said casing;

a shift collar coupled to one of said members for full torque transmission there between, and axially shiftable there along between two positions in which said collar engages two different gears;

at least one gear reduction set connected to one of said members and operatively connectable to the other of said members by motion of said shift collar;

a shift actuator operable within said gear casing from without; and an isolator mechanism located within said casing and connected between said shift actuator and said shift collar and including a spring and a movable ferrule operatively associated with said shift collar for storing the energy of said shift actuator when it operates to disengage one of said members from one of said gears, two discs, one near each end of the ferrule bearing against a shoulder on the ferrule and urged thereagainst by said spring, and an inwardly projecting rib located centrally along the axial length of said ferrule and engageable with said discs, whereby said actuator positively moves said ferrule which compresses said spring and exerts a spring force on said shift collar, and then said rib engages one of said discs to establish a positive mechanical connection between said actuator and said collar to disengage said collar from one of the two gears and said reduction gear set whereupon said actuator reaches the end of its travel before said shift collar engages with the other of the two gears and said reduction gear set so that said engagement is made only under spring force.

3. The gear box defined in claim 2, wherein:

said shift collar is mounted on said output member;

said gear reduction set is a planetary gear set including a sun gear, a ring gear attached to said gear casing, and a set of planet gears engaged with said sun gear and said ring gear and mounted in a planet carrier, and said input member is said sun gear of said planetary gear set;

said shift collar is shiftable between a first position in which it couples said output member and said sun gear, and a second position in which it couples said output member and said planet carrier.

4. The gear box defined in claim 2, wherein:

said isolator includes a spring stressed by said actuator and bearing on said shift collar.

5. A plural speed gear box, comprising:

a housing defining therein a cavity and having an opening at each end of said housing;

an output shaft journaled in one of said openings for rotation about an axis, said shaft having splines formed along a portion of its length;

a planetary gear set disposed in said housing and having (a) a sun gear disposed coaxially with said shaft axis within said housing adjacent the other of said openings;

(b) a planet carrier rotatably disposed coaxially around said sun gear;

(c) a ring gear fixed to said housing coaxially around said sun gear; and (d) a plurality of planet gears journaled for rotation in said carrier and in meshing engagement with said sun gear and said ring gear for orbital movement therearound;

an annular recess formed in said housing;

a piston slidably mounted in said housing for axial movement therein, said piston having a vane extending into said recess and two end portions engaging said housing on either side of said recess and defining two hydraulic chambers between said recess, said vane, and said piston portions;

means for selectively pressurizing said hydraulic chambers to move said piston axially in said housing;

a coupling sleeve having internal splines slidably mounted on said splined portion of said shaft;

a bearing between said sleeve and said piston for permitting relative rotation therebetween around said axis, and for coupling said sleeve and said piston for joint axial motion, so that said sleeve moves axially when said piston moves axially;

a first drive gear on the inside end of said sun gear;

a first driven gear, having a pitch corresponding in pitch to said first drive gear, formed adjacent the end of said sleeve adjacent to said sun gear and movable into engagement with said first drive gear when said sleeve moves toward said sun gear, thereby forming a 1:1 coupling between said output shaft and said sun gear;

a second drive gear mounted on said carrier;

a second driven gear formed adjacent said end of said sleeve and movable into engagement with said second drive gear when said sleeve moves axially away from said sun gear, thereby forming a speed reducing, torque multiplying coupling from sun gear, through said planet gears and said carriers to said sleeve and an isolator means located within said housing coaxially disposed between said bearing and said coupling sleeve and including a spring and a movable ferrule operatively associated with said coupling sleeve for storing the energy of said piston when it operates to disengage said coupling sleeve from said sun gear, two discs, one near each end of the ferrule being against a shoulder on the ferrule and urged thereagainst by said spring, and an inwardly projecting rib located centrally along the axial length of said ferrule and engageable with said discs, whereby said piston positively moves said ferrule which compresses said spring and exerts a spring force on said coupling sleeve, and then said rib engages one of said discs to establish a positive mechanical connection between said piston and said sleeve to disengage said sleeve from said sun gear, whereupon said piston reaches the end of its travel before said coupling sleeve engages with said second drive gear so that said engagement is made only under spring force.

* * * * *